(12) United States Patent
Su et al.

(10) Patent No.: US 6,845,444 B2
(45) Date of Patent: Jan. 18, 2005

(54) METHOD AND APPARATUS FOR REDUCING STRAPPING DEVICES

(75) Inventors: Jen-Pin Su, Hsinchu (TW);
Chun-Chieh Wu, Taichung (TW);
Chao-Yu Chen, San-Chung (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 552 days.

(21) Appl. No.: 09/934,574

(22) Filed: Aug. 23, 2001

(65) Prior Publication Data

US 2003/0041233 A1 Feb. 27, 2003

(51) Int. Cl.[7] .................................................. G06F 9/24
(52) U.S. Cl. ............................. 713/1; 713/2; 713/100
(58) Field of Search ............................... 713/1, 2, 100

(56) References Cited

U.S. PATENT DOCUMENTS

| | | | | |
|---|---|---|---|---|
| 5,381,452 A | * | 1/1995 | Kowalski | 377/26 |
| 5,410,722 A | * | 4/1995 | Cornaby | 718/102 |
| 5,909,557 A | * | 6/1999 | Betker et al. | 710/104 |
| 6,269,443 B1 | * | 7/2001 | Poisner et al. | 713/1 |
| 6,434,632 B1 | * | 8/2002 | Hall | 710/14 |
| 6,625,727 B1 | * | 9/2003 | Moyer et al. | 713/1 |

* cited by examiner

Primary Examiner—A. Elamin
(74) Attorney, Agent, or Firm—Birch, Stewart, Kolasch & Birch, LLP

(57) ABSTRACT

A method is provided to reduce strapping devices in a computer system having at least one configurable device, which includes the following steps. A configuration value stored in a non-volatile memory is first provided. During power-up and reset of the computer system, a processor reset signal and a bus reset signal of a high-speed peripheral bus are both asserted, wherein the high-speed peripheral bus is included in the computer system. When an operation clock of the high-speed peripheral bus reaches its working voltage and frequency, the configuration value is fetched from the non-volatile memory. The fetching step is repeated until a most significant bit (MSB) of a fetched configuration value changes from a first state to a second state. Subsequently, the configuration value fetched from the non-volatile memory is asserted to the at least one configurable device to configure the configurable device, and then the processor reset signal is deasserted, and the at least one configurable device is thereby completely configured.

6 Claims, 5 Drawing Sheets

METHOD AND APPARATUS FOR REDUCING STRAPPING DEVICES

FIELD OF THE INVENTION

The present invention relates generally to the initial configuration of computer systems and, in particular, to a method and apparatus for reducing strapping devices used by computer systems.

BACKGROUND OF THE INVENTION

A computer system typically includes a number of integrated circuit devices, or computer chipsets, that may be operated in more than one configuration. The computer is designed to use the chipsets in only one particular configuration and thus the chipsets must be "initialized" or "set up" whenever a user turns the computer on or resets the computer. The computer chipsets also have some operating parameters which must be set before the first central processing unit (CPU) cycle issues, and thus these parameters cannot be set by normal CPU configuration cycles. Such a chip is usually initialized by providing certain electrical signals to the chip when the computer is turned on or reset. The circuitry used to generate these signals is frequently referred to as the "strapping device". Jumpers and dual inline package (DIP) switches are two examples of strapping devices which set the strapping options for the computer. Several pins of the chip must thus be assigned to receive the configuration signals generated by the strapping devices as soon as power is provided.

However, the computer motherboard assembly employed by these strapping devices is costly and space consuming. Moreover, an integrated circuit chip cannot spare too many dedicated pins for receiving the configuration signals generated by the strapping devices. Accordingly, certain pins of the chip may be used to perform one function during the startup process, while serving another function during normal operation. In other words, these pins are multiplexed. Data pins of a chip are usually this type of multiplexed pin. For a computer system adopting double data rate (DDR) technology, there are some problems if the DDR data pins are connected to the strapping devices, since the DDR data pins must be kept at a stable voltage during bus idle. As well, data pins conforming to the Peripheral Component Interconnect (PCI) specification cannot be used to receive the strapping signals, since the PCI bus is a shared bus and there will be contention if more than one PCI device uses the same data pin to receive the strapping signal. Hence, the static nature of currently available strapping devices makes their use unappealing in such implementations.

For the reasons mentioned previously, a firmware configuration scheme is provided to initialize the operating parameters of a computer system, unencumbered by the limitations associated with the prior art.

SUMMARY OF THE INVENTION

It is one object of the present invention to provide a method and apparatus for reducing strapping devices used in computer systems.

It is another object of the present invention to provide a method and apparatus for efficiently initializing computer configuration that should be set before the CPU reset signal is deasserted.

The present invention is a method and apparatus for reducing strapping devices in a computer system having at least one configurable device. Briefly, the method comprises the following steps. First, a configuration value stored in non-volatile memory is provided to reduce the strapping devices. During power-up and reset states of the computer system, a processor reset signal and a bus reset signal of a high-speed peripheral bus are both asserted, wherein the high-speed peripheral bus is included in the computer system. When an operation clock of the high-speed peripheral bus reaches its working voltage and frequency, the configuration value is fetched from the non-volatile memory. Repeating the fetching step until a most significant bit (MSB) of a fetched configuration value changes from a first state to a second state. Following that, the configuration value fetched from the non-volatile memory is asserted to the at least one configurable device to configure the configurable device, and then the processor reset signal is deasserted, thereby the at least one configurable device is configured completely.

The present invention is embodied in an apparatus comprising a low-speed peripheral bus, a non-volatile memory, and a bridge logic. The non-volatile memory and the bridge logic are separately coupled to the low-speed peripheral bus. The non-volatile memory has a reserve space to store a configuration value for the at least one configurable device. The bridge logic still comprises a latch and a multiplexer. The latch, in response to a configuration enable signal, asserts the configuration value to configure the at least one configurable device. The multiplexer has an output port coupled to the latch. The multiplexer asserts the configuration value stored in the non-volatile memory on the output port during power-up and reset states of the computer system, and asserts run-time programmable configuration information on the output port during other operational states, based on the state of a strapping ready signal.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT

Figure 1A:
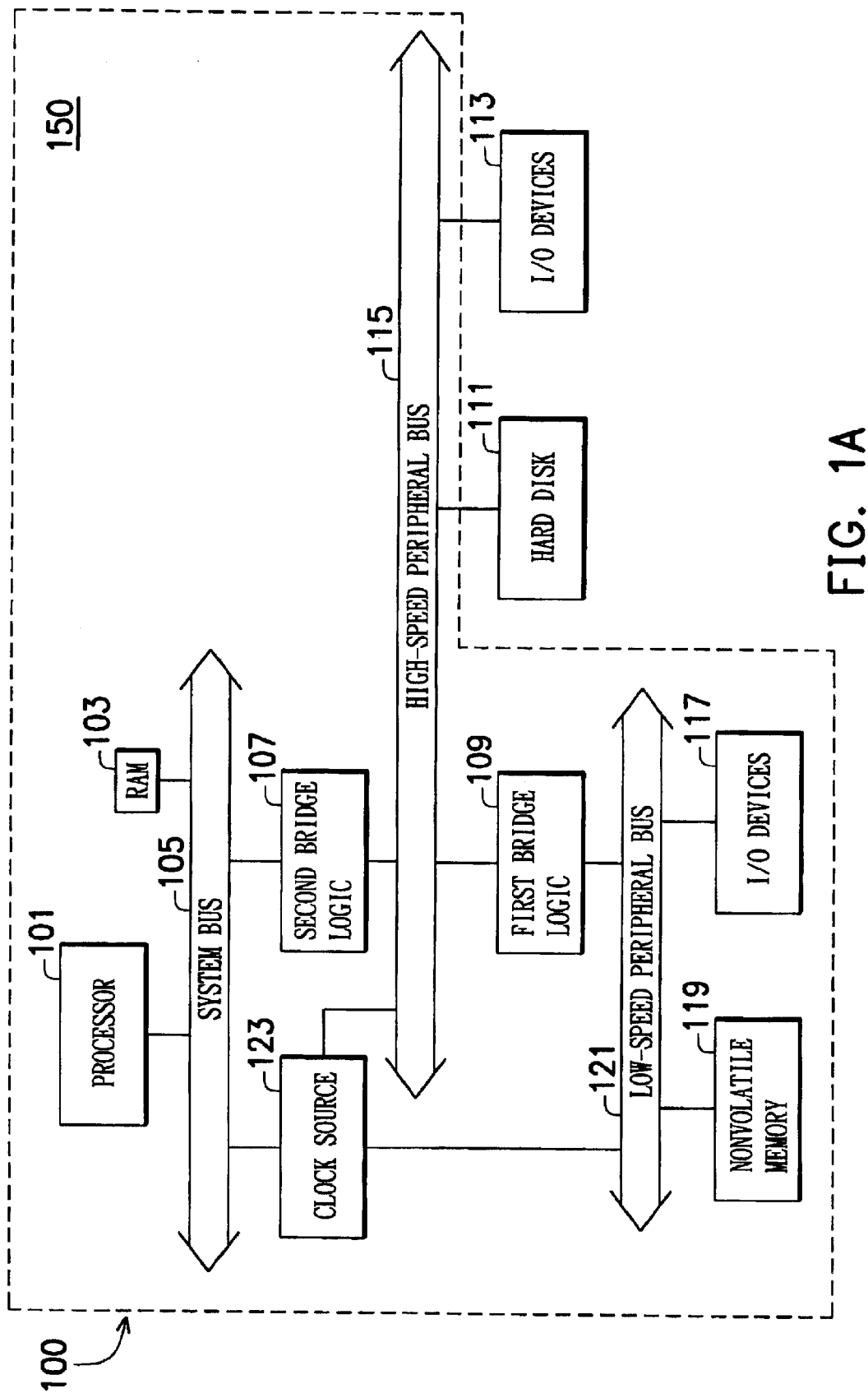
FIG. 1A is a block diagram illustrating an exemplary computer system incorporating the teachings of the present invention.

As illustrated in FIG. 1A, exemplary computer system 100 is shown comprising a computer motherboard 150 including a processor 101, a random access memory (RAM) 103, and a clock source 123, each of which is coupled to a system bus 105 as shown. A second bridge logic 107 is also coupled to system bus 105 for coupling system bus 105 to one or more, typically input/output (I/O), buses. In one embodiment, this bus is a high-speed peripheral bus 115, e.g. Peripheral Component Interconnect (PCI) bus 115. That is to say, the second bridge logic 107 is a system-to-PCI bus bridge (a.k.a., north bridge). As depicted, system-to-PCI bus bridge 107 couples system bus 105 to PCI bus 115. A hard disk 111 is coupled with PCI bus 115 for storing information and instruction for processor 101. I/O devices 113 are also coupled to PCI bus 115 which input and output data and control information to and from processor 101. I/O devices 113 may include, for example, a display device and a network adapter device.

Figure 1B:
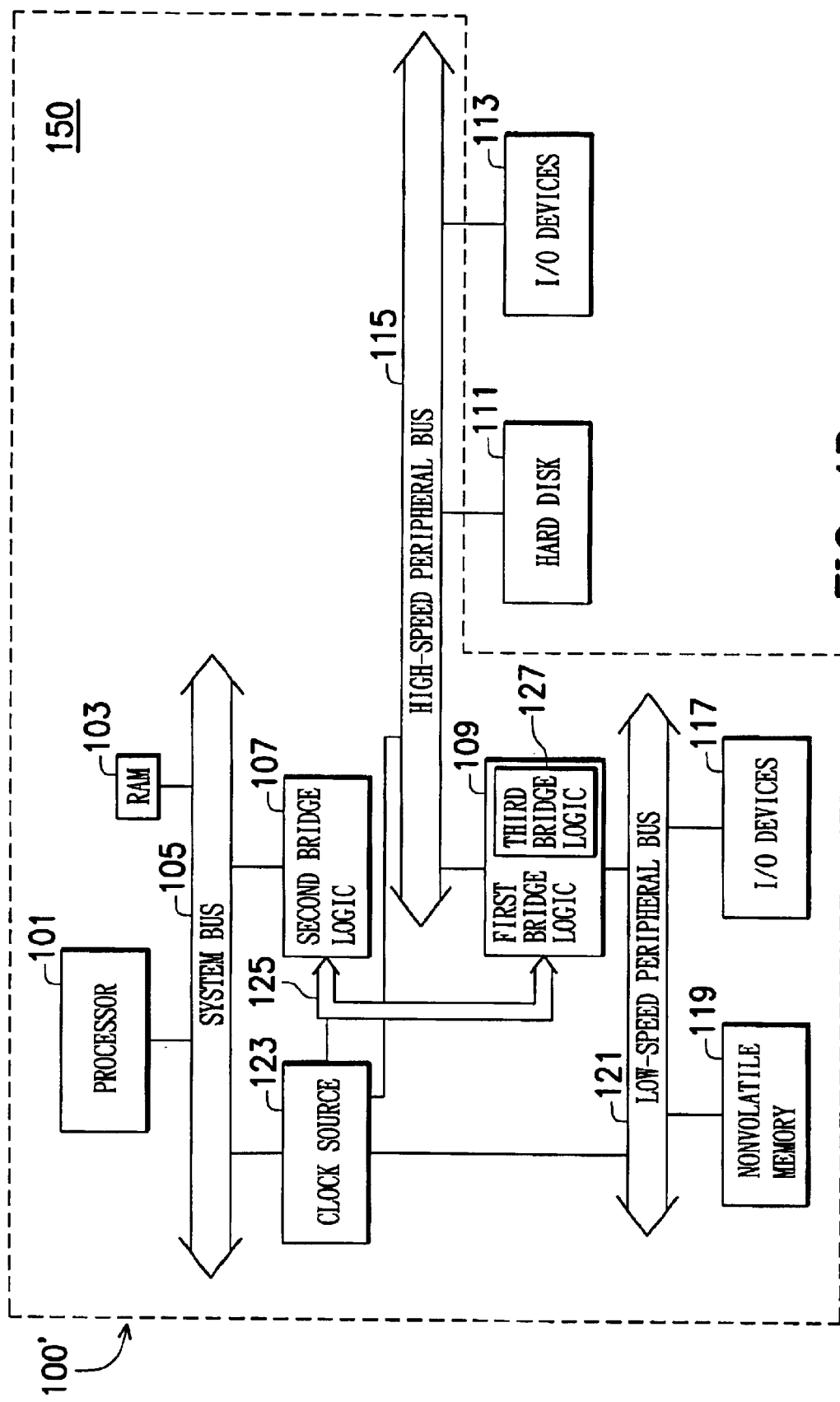
FIG. 1B is a block diagram illustrating an alternative computer system.

With continued reference to FIG. 1, PCI bus 115 is also coupled to a low-speed peripheral bus 121 via a first bridge logic 109. In one embodiment, for example, a low-speed peripheral bus 121 is an Industry Standard Architecture (ISA) bus 121 and the first bridge logic 109 is a PCI-to-ISA bridge (a.k.a., south bridge). The bus clocks of PCI bus 115 and ISA bus 121 are also provided by clock source 123. A non-volatile memory 119 is coupled to ISA bus 121 for storing static information and instruction for processor 101. In one embodiment, non-volatile memory 119 is a flash memory, or an electrically erasable programmable read only memory (EEPROM). I/O devices 117 may also be coupled to ISA bus 121 which input and output data and control information to and from processor 101. FIG. 1B is a block diagram illustrating an alternative computer system 100'. It should be noted that the second bridge logic 107 is directly coupled to the first bridge logic 109 via a point-to-point bus 125. Further, a third bridge logic 127, within the first bridge logic 109, is provided to form an interface between the high-speed peripheral bus 115 and the low-speed peripheral bus 121.

Figure 2:
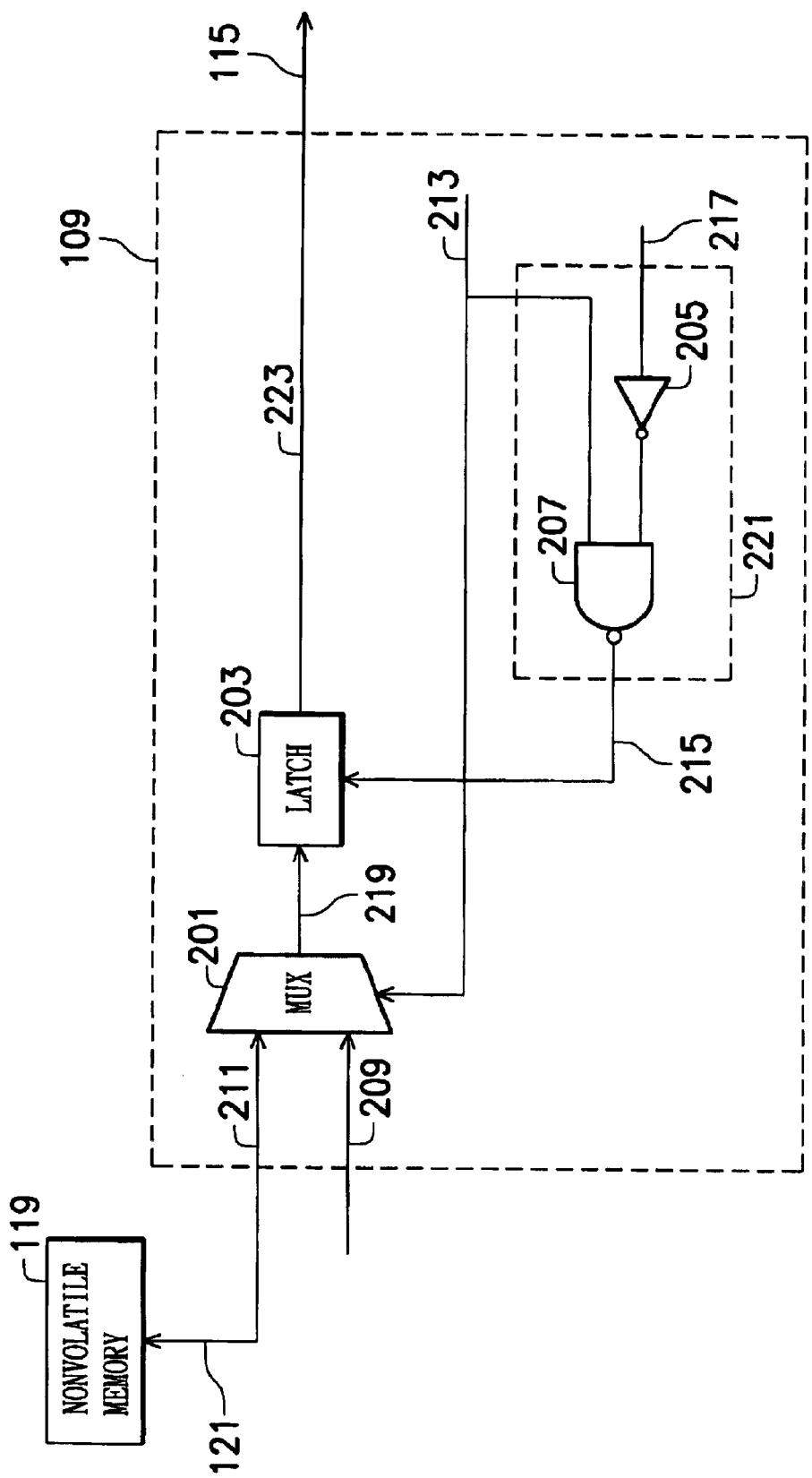
FIG. 2 is a block diagram illustrating a preferred embodiment in accordance with the present invention.

The basic idea of the firmware configuration scheme, in accordance with the present invention, is that the computer chipsets including the first and second bridge logic 107~109 read desired configuration value from non-volatile memory 119 and latch the value into configuration registers before the chipsets deasserting processor reset. FIG. 2 is a block diagram illustrating an expanded view of the first bridge logic 109. The first bridge logic, i.e. south bridge 109, is comprised of a multiplexer 201 and a latch 203. As illustrated, the outputs of non-volatile memory 119 are coupled to one input port 211 of multiplexer 201 via ISA bus 121. The other input port 209 of multiplexer 201 receives run-time programmable configuration information (not shown). As depicted, the output port 219 of multiplexer 201 is coupled to latch 203, and the outputs of latch 203 are transported to the second bridge logic, i.e. north bridge 107, via PCI bus 115. A strapping ready signal, STRP_RDY 213, controls the output of multiplexer 201. When STRP_RDY 213 is deasserted (i.e., during power-up and reset states of exemplary computer system 100), multiplexer 201 will select the configuration value from non-volatile memory 119 to drive on output port 219. Alternatively, when STRP_RDY 213 is asserted (i.e., during other operational states of exemplary computer system 100), multiplexer 201 will select the run-time programmable configuration information to drive on output port 219. Latch 203 is controlled by a configuration enable signal, CONF_ENA 215, output from a combinational logic circuit 221 consisting of a logic NOT gate 205 and a logic NAND gate 207. As depicted, STRP_RDY 213 is directly coupled to one input of the logic NAND gate 207. A run-time programmable configuration write signal, CONF_WR 217, is coupled to the other input of the logic NAND gate 207 by way of logic NOT gate 205. CONF_ENA 215 is asserted except when STRP_RDY 213 is asserted and CONF_WR 217 is deasserted. In other words, whatever input is resident on the input port of latch 203 during STRP_RDY 213 is deasserted, or during STRP_RDY 213 and CONF_WR 217 are both asserted, will be asserted on PCI bus 115.

Figure 3:
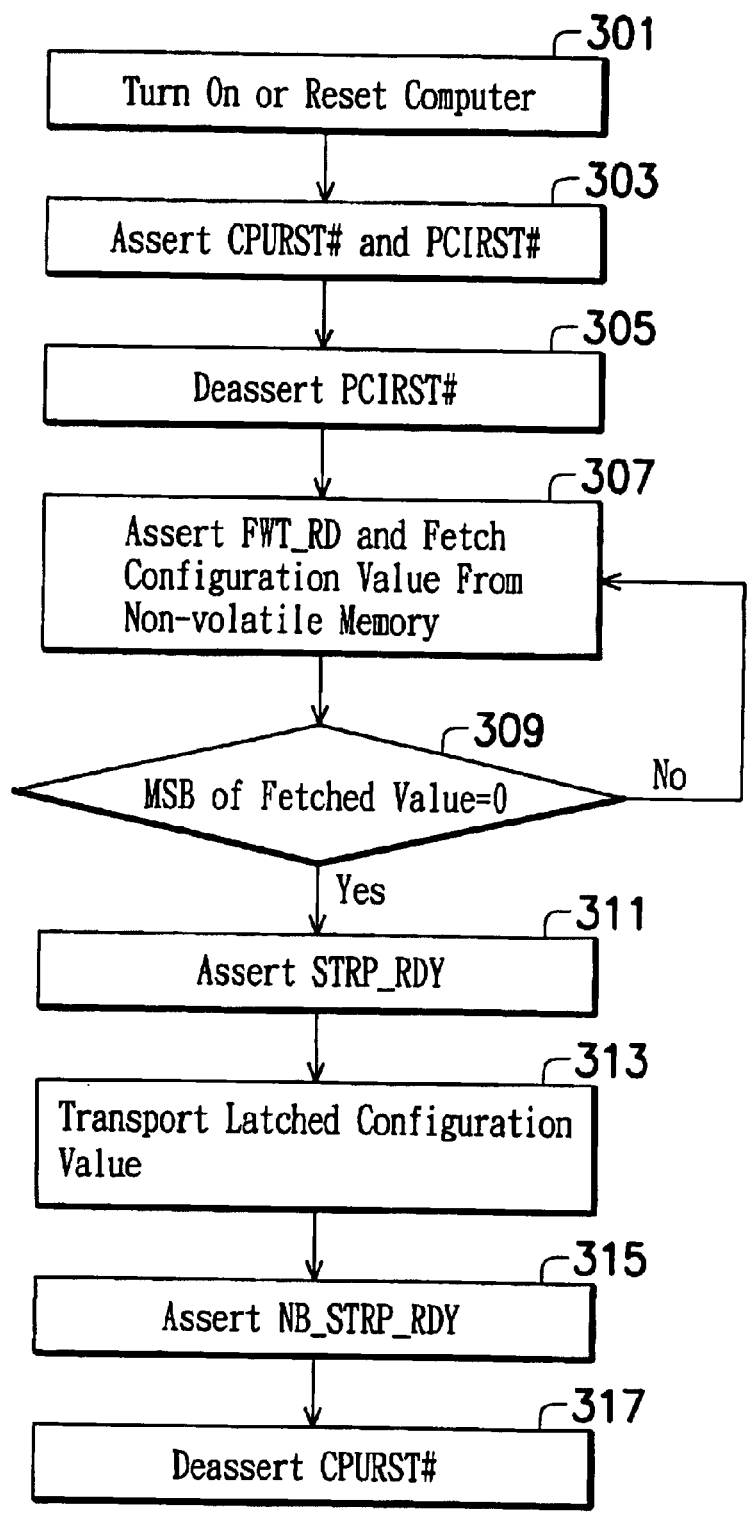
FIG. 3 is a flow chart illustrating an example of the method steps for initializing configuration.
Figure 4:
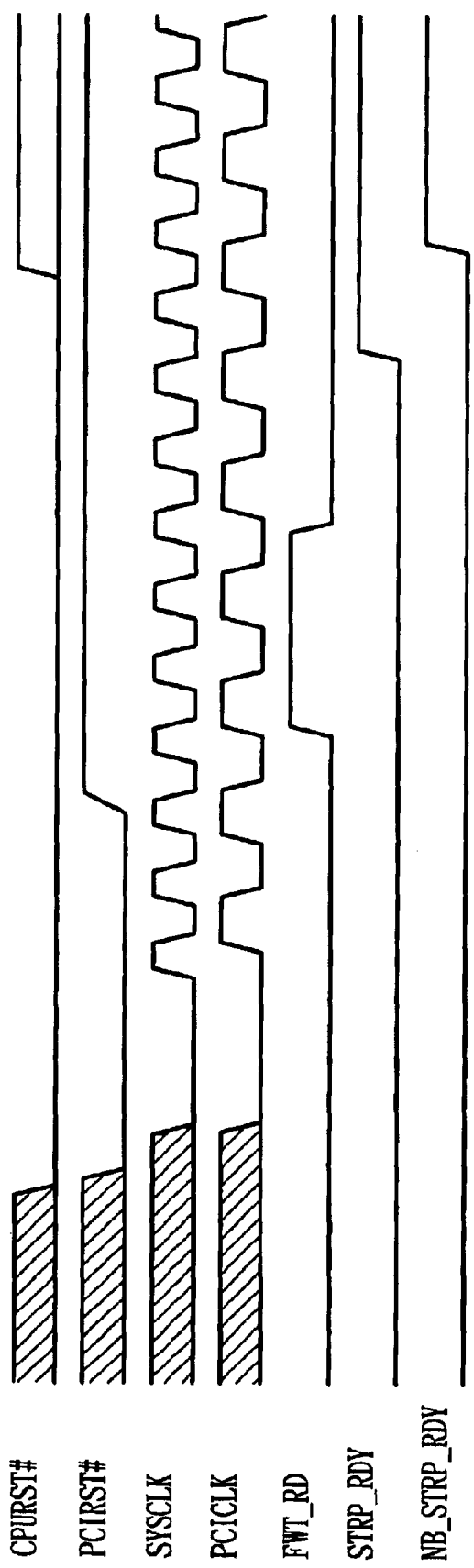
FIG. 4 is a timing chart of signals relative to an initialization cycle in the invention.

Having generally described the hardware elements of the present invention in FIGS. 1 and 2, the operation of the present invention will be further described with reference to FIGS. 3 and 4. The first step of the firmware configuration scheme is to reserve a 64-bit memory space within a basic input/output system (BIOS) area. The reserved space is defined as the non-volatile memory 119 hexadecimal address ranging from FFFFFFD0~FFFFFFD7. The most significant bit (MSB) of the configuration value is programmed to a logic "0", thereby an initialization strapping status of the computer system is indicated. Then, the configuration value is stored into the 64-bit reserved memory space in the non-volatile memory. As computer system 100 is turned on or reset (step 301), a processor reset signal CPURST# (where # denotes an active low trigger), and a bus reset signal PCIRST# of PCI bus 115, must be asserted (step 303). In step 305, after a short period of time, PCIRST# is deasserted as shown in FIG. 4. When system clock SYSCLK of system bus 105 and PCI clock PCICLK of PCI bus 115 are stable, i.e., reaching their working voltages and frequencies, an internal signal FWT_RD in south bridge 109 is asserted. While FWT_RD asserted, a read transaction is initiated to keep fetching data from hexadecimal address FFFFFFD0 until all of the 64-bit configuration value has been successfully read (step 307). If in step 309 it is determined that the MSB of fetched value is a logic "1", the read transaction must be repeated until the MSB of fetched value becomes a logic "0". If the MSB of fetched configuration value is a logic "0", the internal signal FWT_RD will be deasserted. In step 311, STRP_RDY is asserted and the configuration value is latched on the output port of latch 203. In step 313, the latched configuration value is transport to north bridge 107. In step 315, while the latched configuration value is received and latched into configuration registers (not shown) by north bridge 107, an internal signal NB_STRP_RDY in north bridge 107 is asserted. Finally, CPU reset control logic (not shown) in north bridge 107 is activated and CPURST# is deasserted after configurable devices, including processor and chipsets, are set completely (step 317).

Thus, a preferred embodiment for a method and apparatus for reducing strapping devices has been disclosed. It will be apparent that the invention is not limited thereto, and that many modifications and additions may be made within the scope of the invention. Therefore, it is the object of the appended claims to cover all such variations and modifications as come within the true spirit and scope of the invention.

What is claimed is:

1. A method for reducing strapping devices in a computer system having at least one configurable device, the method comprising:

(a) providing a configuration value stored in a non-volatile memory;

(b) asserting a processor reset signal and a bus reset signal of a high-speed peripheral bus, wherein the high-speed peripheral bus is included in the computer system;

(c) fetching the configuration value from the non-volatile memory when an operation clock reaches its working voltage and frequency, wherein the high-speed peripheral bus works at the operation clock;

(d) repeating the step (c) until a most significant bit (MSB) of a fetched configuration value changes from a first state to a second state;

(e) asserting the configuration value fetched from the non-volatile memory to the at least one configurable device to configure the configurable device; and (f) deasserting the processor reset signal, thereby the at least one configurable device is configured completely.

2. The method of claim 1, wherein the step (c) comprises:

deasserting the bus reset signal of the high-speed peripheral bus when the operation clock of the high-speed peripheral bus reaches working voltage and frequency; and fetching the configuration value from the non-volatile memory.

3. The method of claim 1, wherein the step (e) comprises:

latching the fetched configuration value within a first bridge logic; and asserting a strapping ready signal by the first bridge logic;

transporting the fetched configuration value from the first bridge logic to a second bridge logic; and configuring the at least one configurable device in response to the fetched configuration value from the first bridge logic.

4. The method of claim 1, wherein the step (d) repeats the step (c) until the MSB of the fetched configuration value changes from a logic "1" to a logic "0".

5. The method of claim 3, further comprising:

latching run-time programmable configuration information when a run-time programmable configuration write signal is asserted.

6. The method of claim 1, wherein the step (a) comprises:

reserving a 64-bit memory space within a basic input/output system (BIOS) area;

programming the MSB bit of the configuration value into the second state to indicate an initialization strapping status of the computer system; and storing the configuration value into the 64-bit memory space in the non-volatile memory.

\* \* \* \* \*